3,322,399
CATTLE GUARD
James D. Sawyers and Otis Jeff Dorsey, both of
YP Ranch, Tuscarora, Nev. 89834
Filed May 18, 1962, Ser. No. 195,874
6 Claims. (Cl. 256—17)

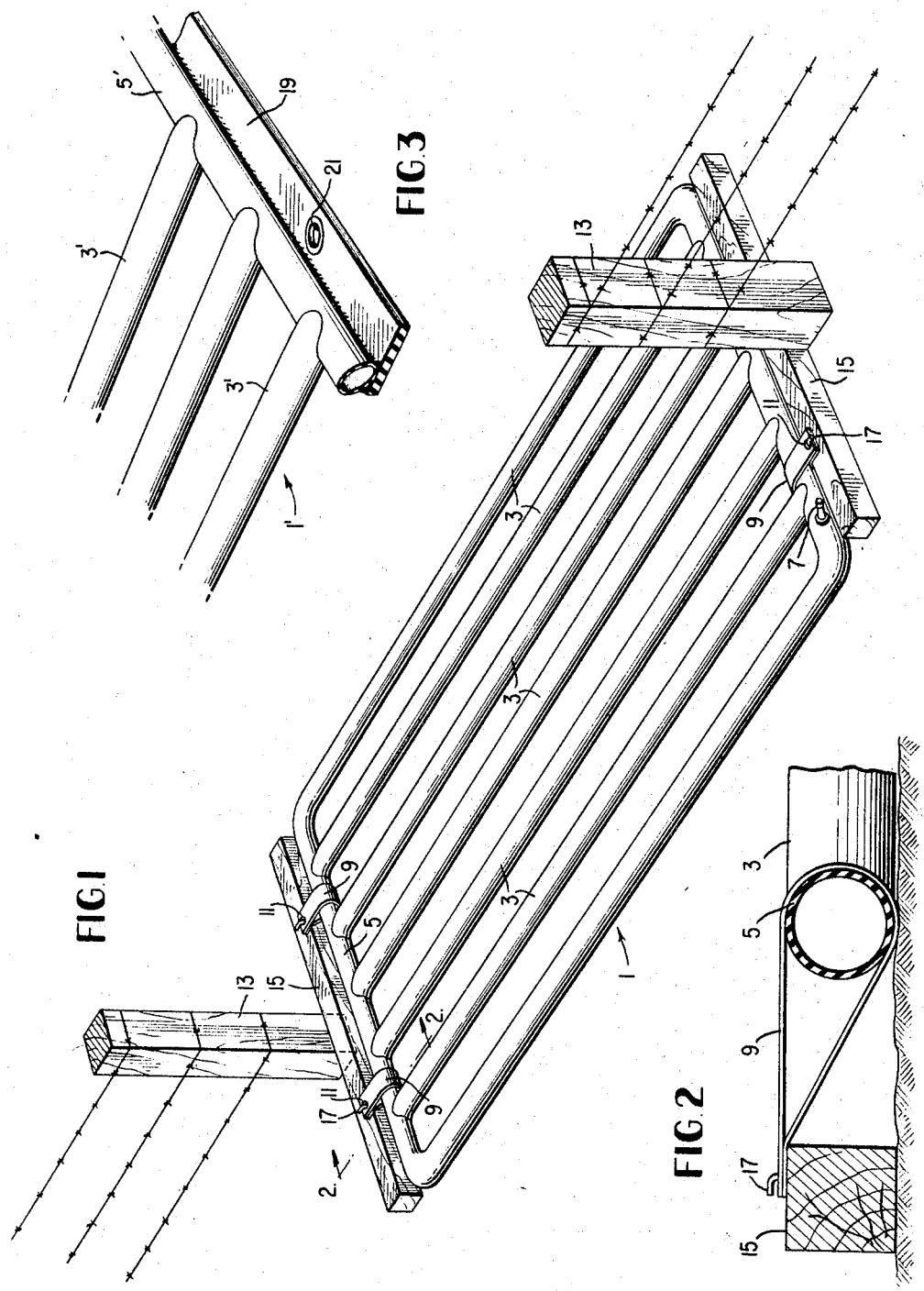

The present invention relates to cattle guards, that is, devices designed to fill an opening in a fence in such a manner that cattle will ordinarily be discourged from passing through the opening.

Cattle guards as previously devised have been of several forms. One of the oldest forms provides a number of rods or beams that are rigid and spaced apart and parallel to the length of the fence. These are spaced a short distance above the ground so as to present to the cattle an extremely uneven terrain which the cattle will not willingly cross.

However, such rigid devices have suffered from a number of disadvantages. In the first place, they are difficult to install and to manipulate. They are heavy and bulky and often require that an excavation be made to accommodate them. When it is desired to open the gate so that cattle may pass freely through the opening in the fence, such rigid guards are quite clumsy to take up and replace. Also, when cattle panic or stampede, they will run across a cattle guard; and the rigid guards heretofore provided are quite dangerous to the cattle, which may catch their hooves between the bars and be injured.

More recently, a type of cattle guard has been proposed which includes a plurality of flexible strips spaced a short distance above the ground and held in tension between end frames. Some of the end frames proposed for this use have been held in spaced apart relation as parts of a rectangular frame, while in other cases the end frames have been anchored to adjacent fence posts. The tension needed to keep the strips off the ground and taut is considerable; and if a rectangular frame is used across which the strips are stretched and tensioned, then the same problems of weight and bulkiness arise that were characteristic of such frames including rigid bars. On the other hand, if the frames are anchored to fence posts, then no heavy framing is needed; but instead, considerable strain is placed on adjacent sections of the fence; and the cattle guard is quite difficult to install, for the frames must be drawn apart with considerable force to tension the strips. Such a guard is not only difficult to install but also extremely cumbersome to open to let cattle through. Thus, although cattle guards with flexible strips are an improvement over rigid bars in the sense that they are not dangerous to the cattle, they are nevertheless quite difficult to use.

Accordingly, it is an object of the present invention to provide a cattle guard which is light in weight and readily portable.

Another object of the present invention is the provision of a cattle guard that will not willingly be crossed by cattle but which presents no danger to cattle should they cross it in panic or during a stampede.

Still another object of the present invention is the provision of a cattle guard of the flexible type that need not be placed in tension and that requires no rigid frame.

A further object of the invention is the provision of a cattle guard which can be driven over by pneumatic-tired vehicles without injury either to the guard or to the vehicle.

Finally, it is an object of the present invention to provide a cattle guard that will be relatively simple and inexpensive to manufacture, easy to carry, install, open and close, maintain and repair, and rugged and durable in use.

Other objects and advantages of the present invention will become apparent from a consideration of the following description, taken in connection with the accompanying drawing, in which:

FIGURE 1 is a perspective view of a cattle guard according to the invention, shown in place in an opening through a fence;

FIGURE 2 is an enlarged fragmentary cross-sectional view on the line 2—2 of FIGURE 1; and FIGURE 3 is an enlarged fragmentary perspective view of a modified form of cattle guard according to the invention.

Briefly, the present invention comprises a cattle guard made of a plurality of elongated resilient members generally parallel to each other and spaced apart from each other in a direction transverse to their length, the members being interconnected at each end thereof and adapted to lie on the ground. The members have such a height that each extends a substantial distance above ground level while at the same time resting on the ground. The space between them provides an uneven terrain which cattle will not willingly cross, but the resiliency of the members avoids injury to the cattle should cattle nevertheless cross them. Pneumatic-tired vehicles can pass over the guard without bumping the vehicle and without injuring the guard.

In the preferred embodiment of the invention, the elongated members are inflatable, so that upon inflation they have a height such that they extend a substantial distance above ground level while at the same time resting on the ground. Also, because they are inflated, they extend to their full length and the cattle guard assumes the desired rectangular form. When they are deflated, however, the cattle guard can easily be folded or rolled up and moved or stored. Also, the inflatable structure makes the cattle guard as light as possible, so that it can be easily opened for the passage of cattle or cleated equipment through the gate. No special framework is needed, for the structure when inflated maintains the desired shape; and it is not necessary to place the guard in tension either by means of a rigid framework or by securing it to the fence posts in tension, for resilient portions of the guard are disposed a substantial distance above ground level simply because the guard is inflated.

Should the guard become covered with drifted snow or sand, it can simply be shaken and placed again on top of the snow or sand. Because only low pressure is needed to inflate the guard, punctures can be quickly repaired by patching.

Referring now to the drawing in greater detail, there is shown in FIGURE 1 a cattle guard indicated generally at 1 and comprising a plurality of elongated tubes 3 which are fluid impervious and flexible and are preferably of rubber. Tubes 3 are parallel to each other and spaced apart. When inflated, they might for example have an outside diameter of four inches and a spacing of six inches between them. Tubes 3 are interconnected at their ends by means of elongated inflatable tubes in the form of headers 5. The interior of tubes 3 is in fluid communication with the interior of headers 5. An inlet valve 7 at a convenient location, preferably along a header 5, permits the cattle guard to be pumped up as with a tire pump but seals the interior of the guard against the escape of air therefrom. Indeed, tubes 3 and headers 5 are sealed against the escape of fluid when inflated. Should a tube 3 be compressed as by an animal or vehicle passing over it, some of the fluid from that tube will of course be displaced into adjacent tubes or headers; but the fact that the tubes and the headers still retain all of the fluid within them makes it plain that the tubes 3 are sealed against the escape of fluid therefrom despite the fact that a small amount of fluid may temporarily be displaced from tubes 3 under pressure.

Cattle guard 1 lies flat on the ground. If the tubes 3 are, say, four inches in diameter, then the tops of those tubes will be disposed four inches above ground level, which is quite adequate to discourage cattle from stepping across. Guard 1 when inflated actually assumes the rectangular form shown in FIGURE 1 and it is not necessary to stretch out the guard or in any way to maintain it in tension. It can simply lie on the ground and do its job. However, it is desirable to secure it in place against accidental displacement; and to this end, straps 9 are provided which encircle headers 5 and terminate at their ends in eyelets 11. To each adjacent fence post 13 a horizontal beam 15 is secured as by nailing at the base of the post to rest on the ground, and beams 15 carry oppositely extending hooks 17 on their upper surfaces, over which eyelets 11 may be hooked to keep the cattle guard in place.

A modified form of cattle guard is shown in FIGURE 3, in which the tubes 3' are in fluid communication with the interior of headers 5' having valves (not shown) therein, as in the embodiment of FIGURE 1, but in which there is secured to the headers 5' an end member 19 which may for example be a heavy flat strip of rubber or rubber-impregnated belting. Preferably, header 5' is vulcanized or otherwise secured to the bottom of end member 19 along substantially the full length of header 5'. An end member 19 is provided at each end of the guard, and each end member has several eyelets 21 set therein for the same purpose as eyelets 11 in the preceding embodiment.

In effect, in the embodiment of FIGURE 3, the end members 21 serve the same purpose as beams 15 in the preceding embodiment, so that although such beams may be used if desired, no separate beams are necessary. When such beams are omitted, then the central eyelet 21 will be used to secure the guard directly to the fence post, as by passing a rope or chain through it or by securing it to a hook screwed into the fence post.

In the embodiment of FIGURE 1, the straps 9 provide means for removably interconnecting the cattle guard with a fence post, while the eyelets 21 perform that function in the embodiment of FIGURE 3.

From a consideration of the foregoing description, it will be obvious that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:
1. In a cattle guard of the type including a plurality of elongated, flexible members in generally coplanar side-by-side relationship generally parallel to each other and adapted to be arranged with the longitudinal axes of the elongated members in a horizontal plane generally parallel to the surface of the earth, the elongated members being spaced apart from each other a sufficient distance and having sufficient height above the surface of the earth to provide a surface which is so uneven as to ordinarily discourage cattle from crossing, the spaces between adjacent elongated members being open to the atmosphere, and means interconnecting the elongated members at each end portion thereof; the combination therewith of the improvements wherein
  the elongated, flexible members are hollow, airtight inflatable members adapted to rest on the surface of the earth and spaced apart from each other a sufficient distance and having sufficient height when inflated to provide said surface which is so uneven as to ordinarily discourage cattle from crossing and wherein
  the interconnecting means are hollow, airtight means in open fluid communication with the inflatable members, the inflatable members being unattached other than by the interconnecting means, and comprising valve means for inflating the inflatable members.

2. In a cattle guard as defined in claim 1, the further combination therewith of the improvement wherein the hollow, airtight interconnecting means include an elongated end header member interconnecting the inflatable members at each end thereof.

3. In a cattle guard as defined in claim 2, the further combination therewith of the improvement wherein the end header members are flexible and inflatable.

4. In a cattle guard as defined in claim 2, the further combination therewith of the improvement comprising releasable means associated with the end header members for fixedly securing the cattle guard between fence posts defining an opening in a fence line.

5. Apparatus for confining cattle, comprising
  a pair of fence posts extending upright from the surface of the earth and defining an opening in a fence line;
  a cattle guard including
  a plurality of elongated, flexible, hollow, airtight inflatable members in generally coplanar, side-by-side relationship generally parallel to each other and to the fence line, the inflatable members resting on the surface of the earth,
  the inflatable members being spaced apart from each other a sufficient distance and having sufficient height when inflated to provide a surface which is so uneven as to ordinarily discourage cattle from crossing, the spaces between adjacent inflatable members being open to the atmosphere,
  hollow, airtight means in open fluid communication with the inflatable members and interconnecting the inflatable members at each end portion of the inflatable members, the inflatable members being unattached other than by the interconnecting means, and
  valve means for inflating the inflatable members; and
  releasable means for fixedly securing the cattle guard between the fence posts.

6. Apparatus for confining cattle as defined in claim 5, wherein the hollow, airtight means interconnecting the inflatable members include an elongated flexible, inflatable end header member interconnecting the inflatable members at each end thereof.

References Cited
UNITED STATES PATENTS

| | | | |
|---|---|---|---|
| 1,089,652 | 3/1914 | Lisboe | 5—348 |
| 2,028,060 | 1/1936 | Gilbert | 5—348 X |
| 2,245,909 | 6/1941 | Enfiajian | 5—348 |
| 2,772,193 | 11/1956 | Iwao Ono | 5—348 X |
| 2,987,114 | 6/1961 | Klepper | 5—348 |

DAVID J. WILLIAMOWSKY, *Primary Examiner.*

HARRISON R. MOSELEY, *Examiner.*

D. L. TAYLOR, *Assistant Examiner.*